United States Patent [19]

King

[11] Patent Number: 5,548,798
[45] Date of Patent: Aug. 20, 1996

[54] METHOD AND APPARATUS FOR SOLVING DENSE SYSTEMS OF LINEAR EQUATIONS WITH AN ITERATIVE METHOD THAT EMPLOYS PARTIAL MULTIPLICATIONS USING RANK COMPRESSED SVD BASIS MATRICES OF THE PARTITIONED SUBMATRICES OF THE COEFFICIENT MATRIX

[75] Inventor: Adrian S. King, Albuquerque, N.M.

[73] Assignee: Intel Corporation, Santa Clara, Calif.

[21] Appl. No.: 337,246

[22] Filed: Nov. 10, 1994

[51] Int. Cl.$^6$ .............................. G06F 7/52; G06F 9/345
[52] U.S. Cl. .................. 395/888; 395/800; 364/DIG. 1; 364/DIG. 2; 364/735; 340/825.79
[58] Field of Search ................... 395/800, 93, 74, 395/86, 98, 25, 650, 23, 84, 375, 600, 2.12, 2.28, 22, 888, 458, 200; 364/DIG. 1, DIG. 2, 735, 402, 553, 578, 413.13, 490; 342/359, 352; 379/386; 340/825.28, 825.79; 382/274

[56] References Cited

U.S. PATENT DOCUMENTS

| | | | |
|---|---|---|---|
| 4,942,538 | 7/1990 | Yuan et al. | 395/94 |
| 4,995,088 | 2/1991 | Farhat | 395/25 |
| 5,301,342 | 4/1994 | Scott | 395/800 |
| 5,347,286 | 9/1995 | Babitch | 342/359 |
| 5,392,429 | 2/1995 | Agrawal et al. | 395/650 |

OTHER PUBLICATIONS

"The Determination of the far field of an acoustic radiator from sparse measurement samples in the near field"; Giorgio V. Borgiotti et al., Aug. 1992. J. Acoust. Soc. Am.; vol. 92, No. 2, Pt. 1. pp. 807–818.

Fahnline, John B. et al., A numerical solution for the general radiation problem based on the combined methods of superposition and singular value decomposition, J. I. Acout. Soc. Am. 90; Nov. 1991; pp. 2808–2819.

Golub, G. H. et al., A Block Lanczos Method For Computing the Singular values & Corresponding Singular Vectors of a Matrix; ACM Transaction on Mathematical Software, vol. 7, No. 2, Jun. 1981, pp. 150–169.

Bucci O. M. et al., On the Spatial Bandwidth of Scattered Fields, IEEE Transactions on Antennas & Progagation, vol. AP-35, No. 12, Dec. 1987, published by IEEE.

Coifman R. et al., The Fast Multipole Method for the Wave equation; A Pedestrian Prescription, IEEE Antennas & Propagation Magazine, vol. 35, No. 3, Jun. 1993, published by IEEE; pp. 7–12.

*Primary Examiner*—Daniel H. Pan
*Attorney, Agent, or Firm*—Blakely, Sokoloff, Taylor & Zafman

[57] ABSTRACT

A computer system and a method employed thereon is provided to solve a dense system of linear equations using an iterative method coupled with rank compressed singular value decomposed (SVD) basis matrices of partitioned submatrices of the coefficient matrix. More specifically, before solving a dense system of linear equations using an otherwise prior art iterative method, the computer system and the method implemented thereon generates the rank compressed SVD basis matrices, and whenever a matrix multiplication involving the coefficient matrix is to be performed in one of the iterative method steps, the matrix multiplication is performed indirectly using the generated rank compressed SVD basis matrices.

32 Claims, 11 Drawing Sheets

N

| 202<br>A1<br>(m x n) | 204<br>A2<br>(m x n) | 206<br>A3<br>(m x n) | 208<br>A4<br>(m x n) |
|---|---|---|---|
| 210<br>A5<br>(m x n) | 212<br>A6<br>(m x n) | 214<br>A7<br>(m x n) | 216<br>A8<br>(m x n) |
| 218<br>A9<br>(m x n) | 220<br>A10<br>(m x n) | 222<br>A11<br>(m x n) | 224<br>A12<br>(m x n) |
| 226<br>A13<br>(m x n) | 228<br>A14<br>(m x n) | 230<br>A15<br>(m x n) | 232<br>A16<br>(m x n) |

METHOD AND APPARATUS FOR SOLVING DENSE SYSTEMS OF LINEAR EQUATIONS WITH AN ITERATIVE METHOD THAT EMPLOYS PARTIAL MULTIPLICATIONS USING RANK COMPRESSED SVD BASIS MATRICES OF THE PARTITIONED SUBMATRICES OF THE COEFFICIENT MATRIX

BACKGROUND OF THE INVENTION

1. Field of the Invention

The present invention relates to the fields of computer systems and computer implemented numerical intensive computing methods. More specifically, the present invention relates to high performance computer systems including parallel processing computers and method steps for solving dense systems of linear equations thereon.

2. Background Information

For some applications, such as determining the radar cross section of aircraft, or simulating flow across an airfoil, very large systems of linear equations are used. These linear equations sometimes range on the order of 250,000 variables or more. It therefore is necessary to manipulate very large matrices comprising 250,000×250,000 variables or more. Typical prior art computer implemented methods would have required storage of the entire coefficient matrix, all 250,000×250,000 elements, and floating point operations on the order of $(8/3) \times (250K)^3$ to solve one such system of linear equations. Due to the required processing power and I/O speed, problems of these magnitudes are typically reserved for the most powerful supercomputers known in the art. Even employing the most powerful supercomputers known in the art, many of these problems would still require hundreds of hours of computing time to solve.

In U.S. Pat. No. 5,301,342, assigned to the assignee of the present invention, a parallel processing computer and a method implemented thereon was disclosed, allowing these problems to be solved with substantially less storage requirements. Under the disclosed computer implemented method, the coefficient matrix is divided into a plurality of ND row sections, a plurality of ND column sections and ND diagonal sections. Each of these sections is known as a disk section. The disk sections are stored on non-volatile media such as magnetic and/or optical disks, and are brought into memory on an as needed basis. Further, the unknown variables are represented by a vector comprising N sections. Each of the plurality of j row sections and j column sections is factored. Then, the j diagonal section is factored and inverted. These steps are repeated for all values of j that range from 1 to ND. Forward elimination is then performed for all sections in the vector using the coefficient matrix, and finally, back substitution is performed for all sections in the vector using the coefficient matrix. While the disclosed processor and the method implemented thereon substantially addressed the storage requirement dimension of these problems, the floating point operation requirement dimension remains substantially unaddressed.

Thus, it is desirable to have a computer system and method implemented thereon that can solve these dense systems of linear equations with substantially reduced floating point operation requirement as well as storage requirement. Preferably, the reduction would be in multiple orders of magnitude. As will be disclosed in more detail below, the method and apparatus of the present invention achieves these and other desirable results.

SUMMARY OF THE INVENTION

The desired results are advantageously achieved by providing a computer system and a method employed thereon that solves a dense system of linear equations using an iterative method coupled with rank compressed singular value decomposed (SVD) basis matrices of partitioned submatrices of the coefficient matrix. More specifically, before solving a dense system of linear equations using an otherwise prior art iterative method, the computer system and the method implemented thereon generates the rank compressed SVD basis matrices, and whenever a matrix multiplication is to be performed in one of the iterative method steps, the matrix multiplication is performed indirectly using the generated rank compressed SVD basis matrices.

The rank compressed SVD basis matrices are generated by first having the coefficient matrix partitioned into a plurality of submatrices. Rank compressed SVD basis matrices are then generated for each of the submatrices.

In one embodiment, each set of SVD basis matrices is first generated in a singular value size independent manner, and then the set of SVD basis matrices are rank compressed by zeroing the insignificant non-zero diagonal singular values in the diagonal basis matrix and their corresponding elements in the other two associated basis matrices. Significance of the non-zero diagonal singular values is gauged by their contributions to achieving a desired calculation accuracy. In an alternate embodiment, each set of the SVD basis matrices is generated in a singular value size dependent manner, and the generation process is aborted when a newly generated singular value is less than the first generated singular value (which by design is the largest singular value) by a desired accuracy threshold.

In one embodiment, the computer system is a parallel processing computer system, and the method implemented thereon further distributes the generation of rank compressed SVD basis matrices, and the partial multiplications of the various rank compressed SVD basis matrices to the various computing nodes of the parallel processing computer system.

BRIEF DESCRIPTION OF DRAWINGS

The present invention will be described by way of exemplary embodiments, but not limitations, illustrated in the accompanying drawings in which like references denote similar elements, and in which:

FIG. 11 illustrates partitioning of a coefficient matrix into submatrices in accordance to the present invention.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
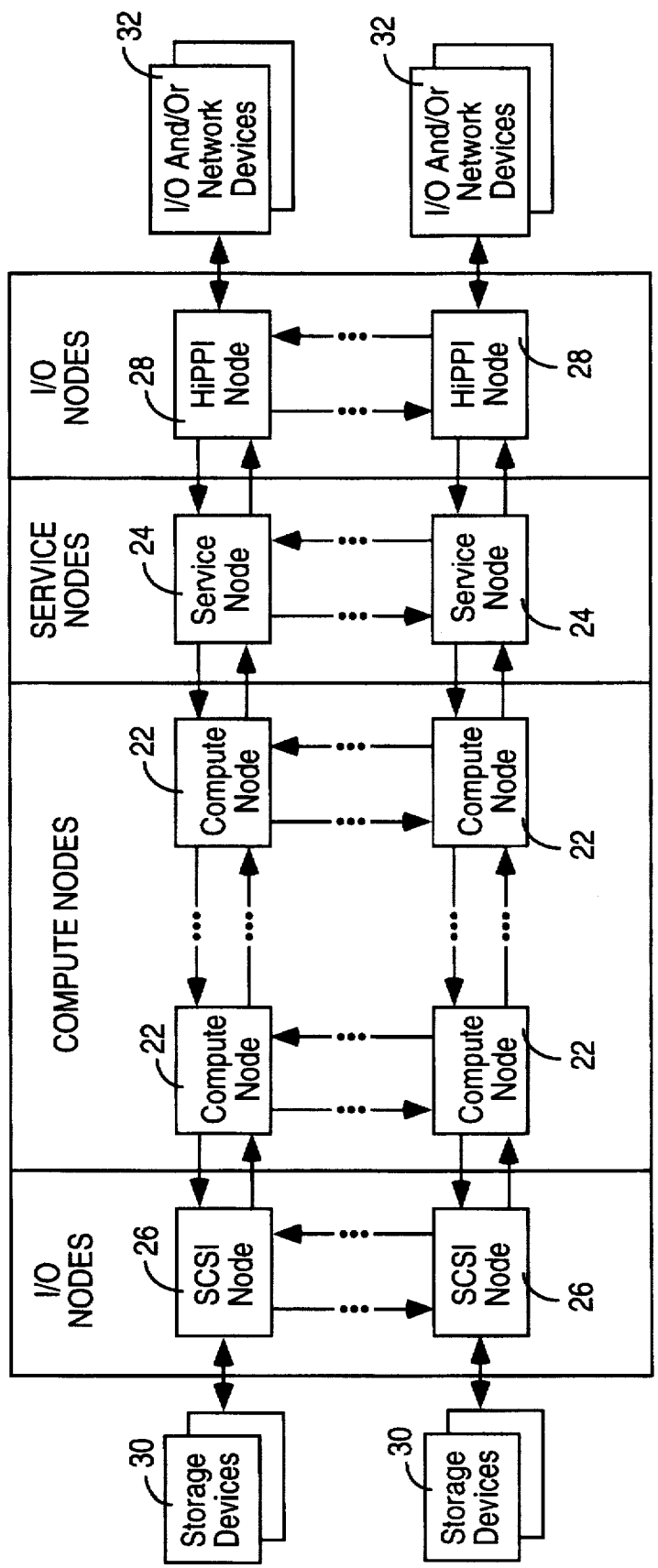
FIG. 1 illustrates an exemplary computer system incorporated with teachings of the present invention.

Referring now to FIG. 1, a block diagram illustrating an exemplary computer system 20 incorporating the teachings of the present invention is shown. Exemplary computer system 20 is a parallel processing computer system comprising compute nodes 22, service nodes 24, and I/O nodes 26 and 28. Each node 22, 24, 26, or 28 may be a single processor node or may be multi-processor node. Nodes 22, 24, 26, or 28 are interconnected together using a mesh topology. I/O nodes 26 are further interconnected to a number of electromagnetic or optical storage devices 30, whereas I/O nodes 28 are further interconnected to a number of I/O and/or network devices 32.

Compute nodes 22 are used to execute application programs. In particular, the application programs include the linear equations solver of the present invention for solving dense systems of linear equations with significantly reduced storage as well as floating point operation requirements. The linear equations solver of the present invention will be described in more detail below. Service nodes 24 are used to manage operating system services and interaction with log-on users. I/O nodes 26 and 28 are used to control internal and external mass storage devices and network connections and support I/O interfaces such as high performance parallel interface (HiPPI) or the small computer systems interface (SCSI).

Except for the teachings of the present invention, exemplary computer system 20 is intended to represent a broad category of parallel processing computer systems, and elements 22, 24, 26 and 28 are intended to represent a broad category of similar elements found thereon. A particular example of parallel processing computer system is the Paragon™ Supercomputer manufactured by Intel Corporation of Santa Clara, Calif., assignee of the present invention.

While the present invention is being described using a parallel processing computer system, based on the description to follow, it will be obvious to those skill in the art that the present invention may be practiced in more conventional multi-processor systems as well as uniprocessor systems.

Figure 2:
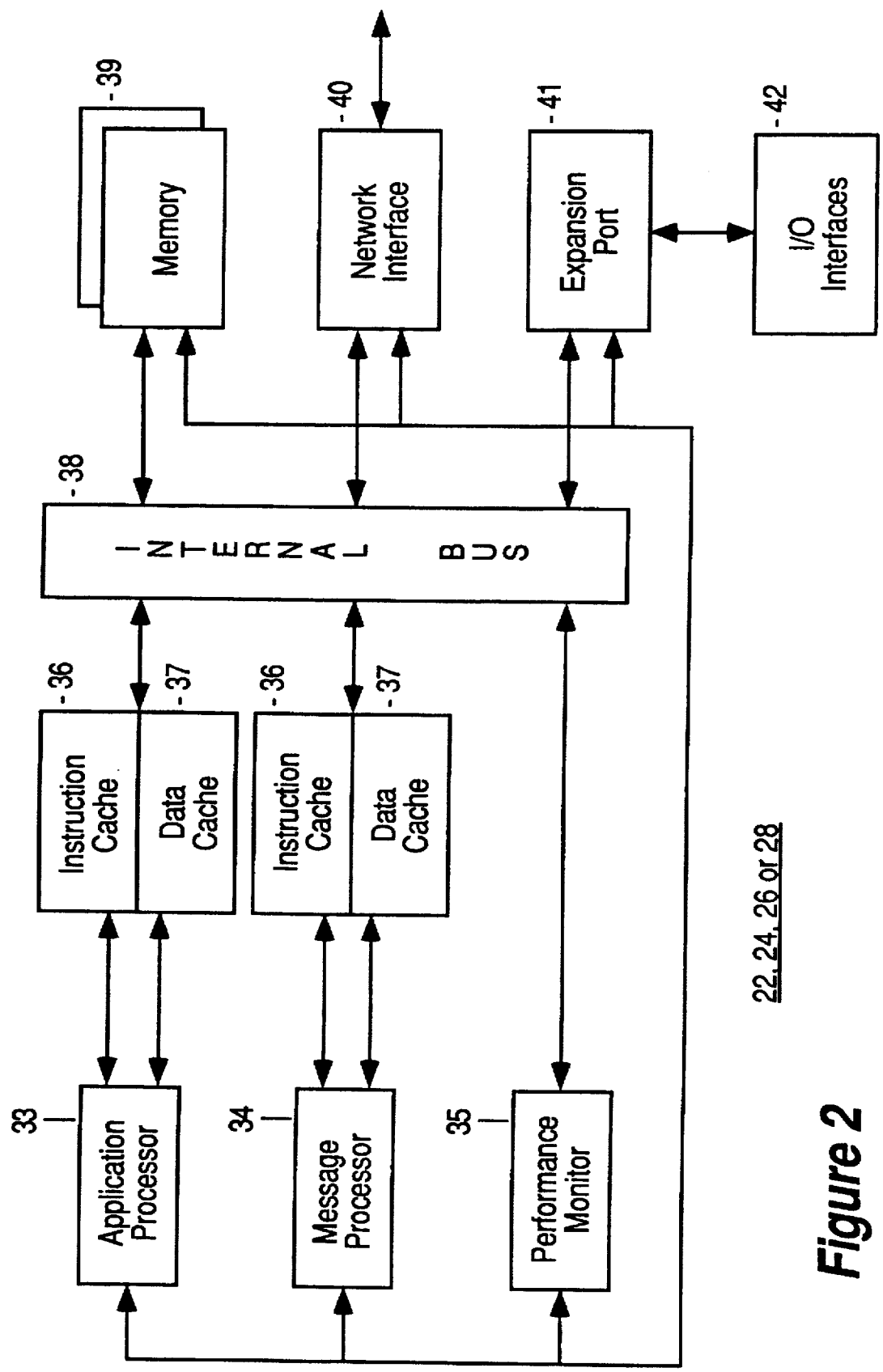
FIG. 2 illustrates one embodiment of the hardware architecture of one of the nodes of the exemplary computer system of FIG. 1.

FIG. 2 illustrates one embodiment of the hardware architecture of one of the nodes 22, 24, 26 and 28 of exemplary computer system 20. For the illustrated embodiment, node 22, 24, 26 or 28 comprises application processor 33, message processor 34, instruction cache 36 and data cache 37 coupled to each other as shown. Furthermore, node 22, 24, 26 or 28 comprises performance monitor 35, internal bus 38, memory 39, network interface 40, expansion port 41 and I/O interfaces 42 coupled to each other as shown. Instruction and data cache 36 and 37 are also coupled to the internal bus 38.

Application processor 33 is dedicated to executing application, service or I/O handler code of node 22, 24, 26 or 28 depending on the nature of the node. Message processor 34 is dedicated to message processing and routing. Performance monitor 35 collects runtime diagnostic and runtime information for debugging and performance analysis. Instruction cache 36, data cache 37, internal bus 38, memory 39, network interface 40, expansion port 41 and I/O interfaces 42 perform their conventional functions.

For the Paragon™ Supercomputer, application processor 33 is an i860 XP RISC processor manufactured by the assignee of the present invention, capable of executing 42 MIPS, with a peak floating point performance of 75 double precision MFLOPS and a floating-point-unit-to-cache bandwidth peak of 800 MB/sec. Instruction and data caches 36 and 37 are typically 16 KB in size, whereas memory 39 is typically 16, 32 or 64 MB in size.

Figure 3:
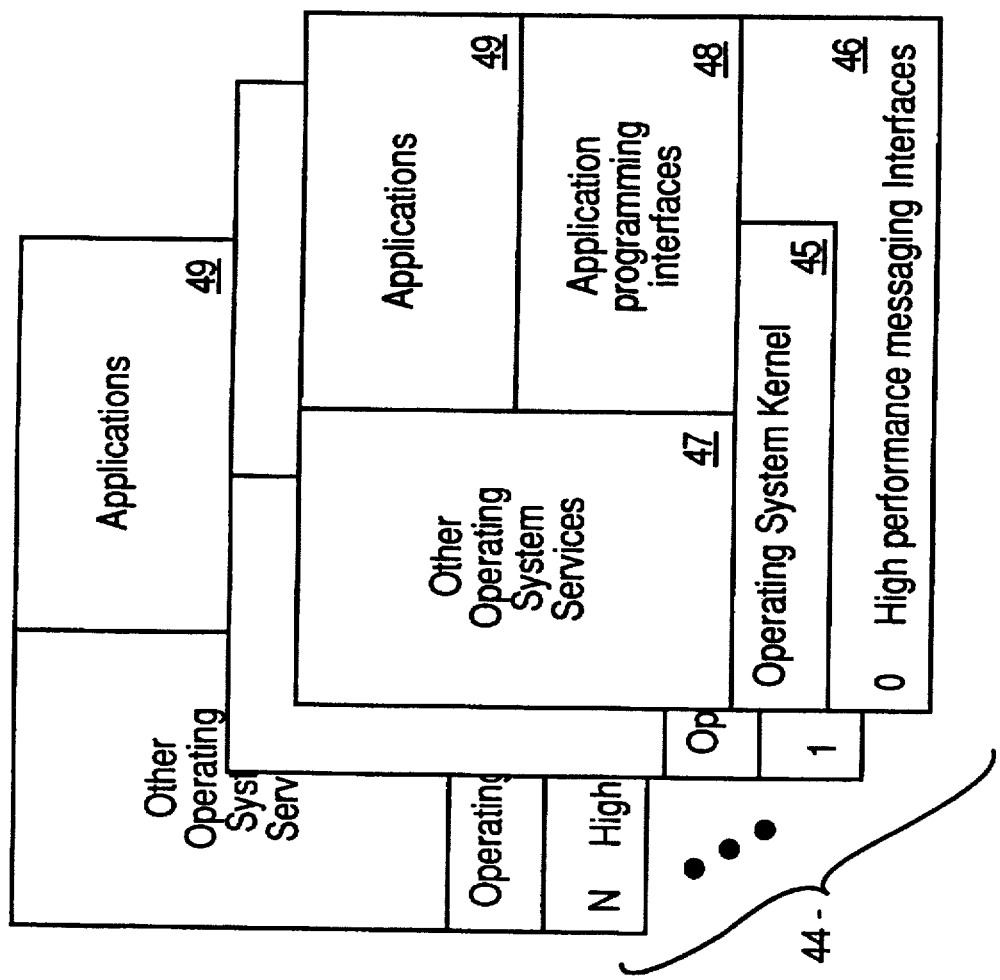
FIG. 3 illustrates one embodiment of the software architecture of the exemplary computer system of FIG. 1.

FIG. 3 illustrates one embodiment of the software architecture of exemplary computer system 20. As shown, exemplary computer system 20 implements a distributed operating system 44 comprising a number of identical operating system kernels 45, a number of identical high performance messaging interface 46 and a number of tailored operating system services 47 correspondingly resident at each node 22, 24, 26 or 28. Specialized operating system services 47 are placed only on nodes 22, 24, 26 or 28 that needs them.

Additionally, each node 22, 24, 26 or 28 is provided with an identical set of application programming interfaces 48 to facilitate access to operating system services 47 by applications 49 executing on the node 22, 24, 26 or 28. In particular, the distributed operating system 44 presents a single system image to the executing applications 49 as if the multi-node parallel processing computer system 20 is a single processor computer system. As described earlier, applications 49 include the linear equations solver of the present invention. As will be described in more detail below, for a parallel processing computer system such as exemplary computer system 20, the linear equations solver of the present invention is preferably implemented in a distributed manner on the various nodes 22, 24, 26 or 28.

Figure 4:
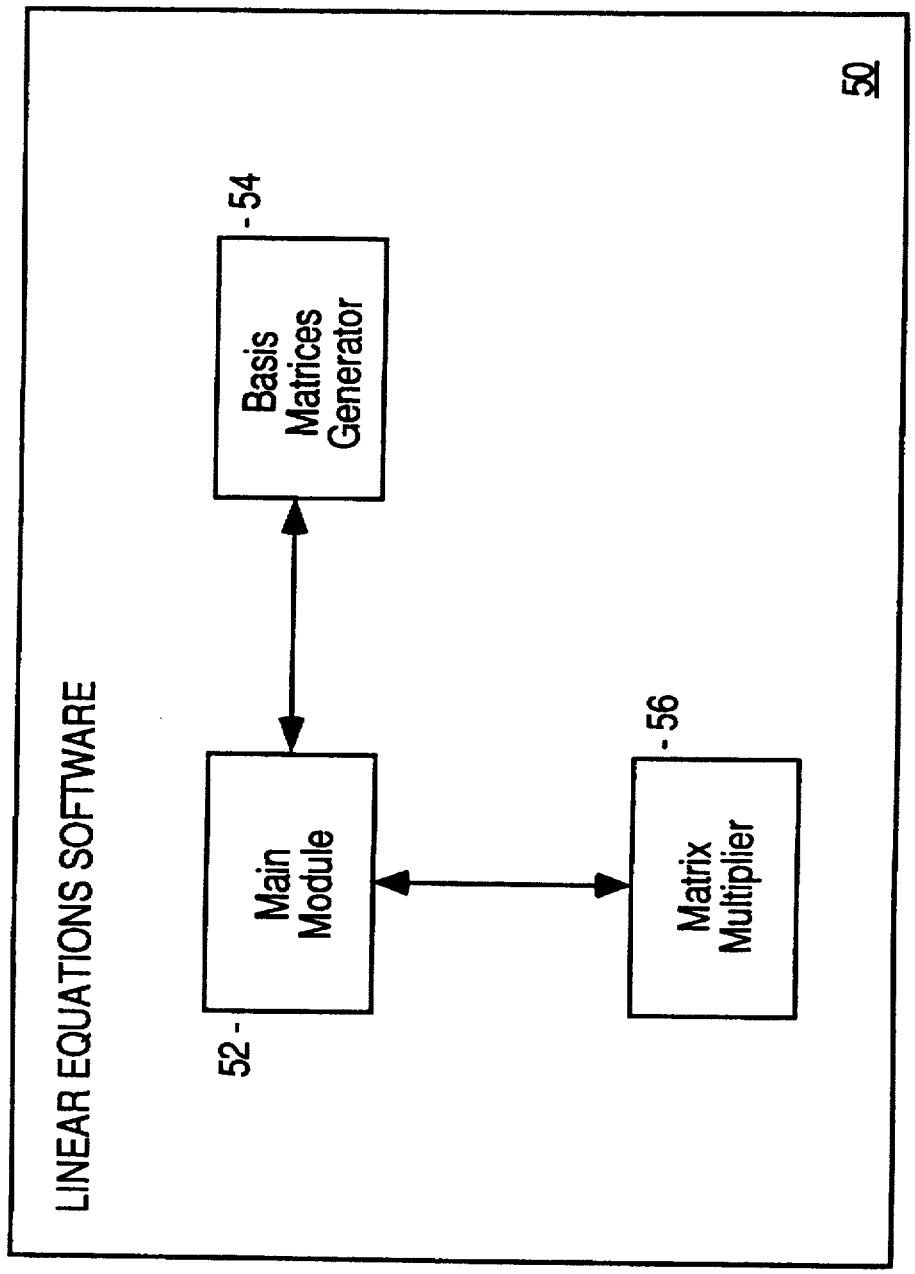
FIG. 4 illustrates one embodiment of the linear equations solver of the present invention.

FIG. 4 illustrates one embodiment of the linear equations solver of the present invention incorporated in exemplary computer system 20. For the illustrated embodiment, linear equations solver 50 comprises main module 52, basis matrices generator 54 and matrix multiplier 56. Main module 52 implements substantially one or more prior art iterative methods. Particular examples of such prior art iterative methods include the conjugate gradient and the generalized minimum residuals methods, which are both well known in the art. However, main module 52 is designed to supplement the prior art iterative methods with functions implemented by the basis matrices generator 54 and the matrix multiplier 56, exploiting the teachings of the present invention incorporated therein.

Basis matrices generator 54 partitions a coefficient matrix into a plurality of submatrices, and generates rank compressed SVD basis matrices for the submatrices, whereas matrix multiplier 56 performs matrix multiplications involving the coefficient matrix in a significantly more expedited manner using the generated rank compressed SVD basis matrices. For exemplary computer system 20, both basis matrices generator 54 as well as matrix multiplier 56 are implemented in a distributed manner on the various computing nodes 22. The distributed manner of implementation will be ready apparent to those skilled in the art from the description to follow.

Figure 5:
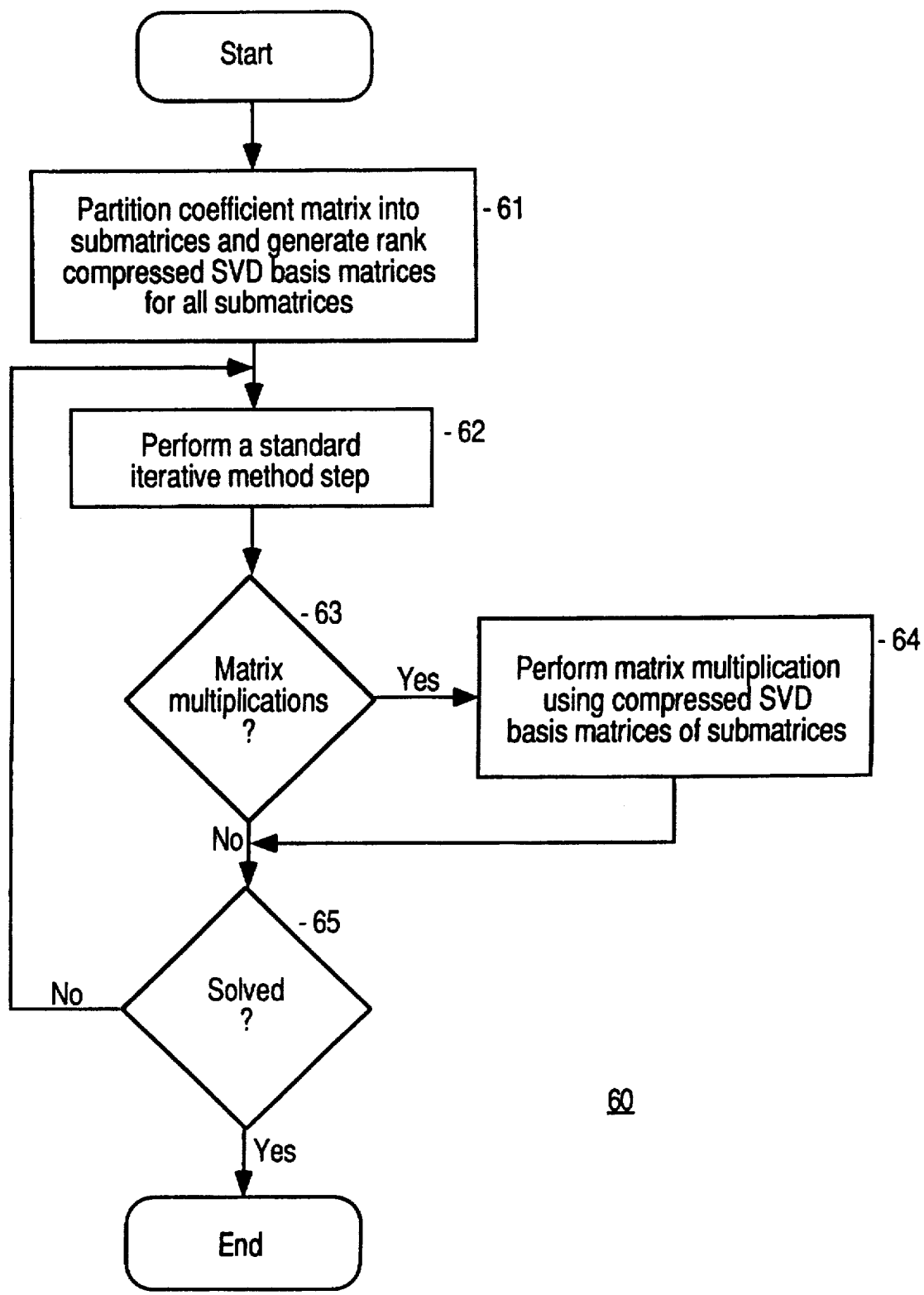
FIG. 5 illustrates the computer implemented method steps of the present invention for solving a dense system of linear equations.

FIG. 5 illustrates one embodiment of the method steps of present invention implemented by main module 52. As shown, before solving a system of linear equations using one of the prior art iterative method, main module 52 invokes basis matrices generator 54 to partition the coefficient matrix of a system of linear equations into a plurality of submatrices, and generate rank compressed SVD basis matrices for each of the partitioned submatrices, step 61. Step 61 will be described in more detail below. Typically, the partitioned submatrices are stored in non-volatile storage devices 30. However, the rank compressed SVD basis matrices, because of their reduced sizes (the zero value elements are not stored) which will be readily apparent from the descriptions to follow, may be stored in volatile memory 39 of the compute nodes 22 or non-volatile storage devices 30.

Upon causing the rank compressed SVD basis matrices to be generated, step 61, main module 52 then proceeds to perform a traditional iterative method one step at a time, step 62. Whenever, matrix multiplication involving the coefficient matrix is required, step 63, main module 52 invokes matrix multiplier 56 which would perform the multiplication indirectly using the generated rank compressed SVD basis matrices, step 64. Step 64 will also be described in more detail below.

Main module 52 repeats steps 62–64 until it can determine at step 65 that the dense system of linear equations is solved. For the purpose of this disclosure, solving includes also determining that there is no unique solution to the dense system of linear equations.

Figure 6:
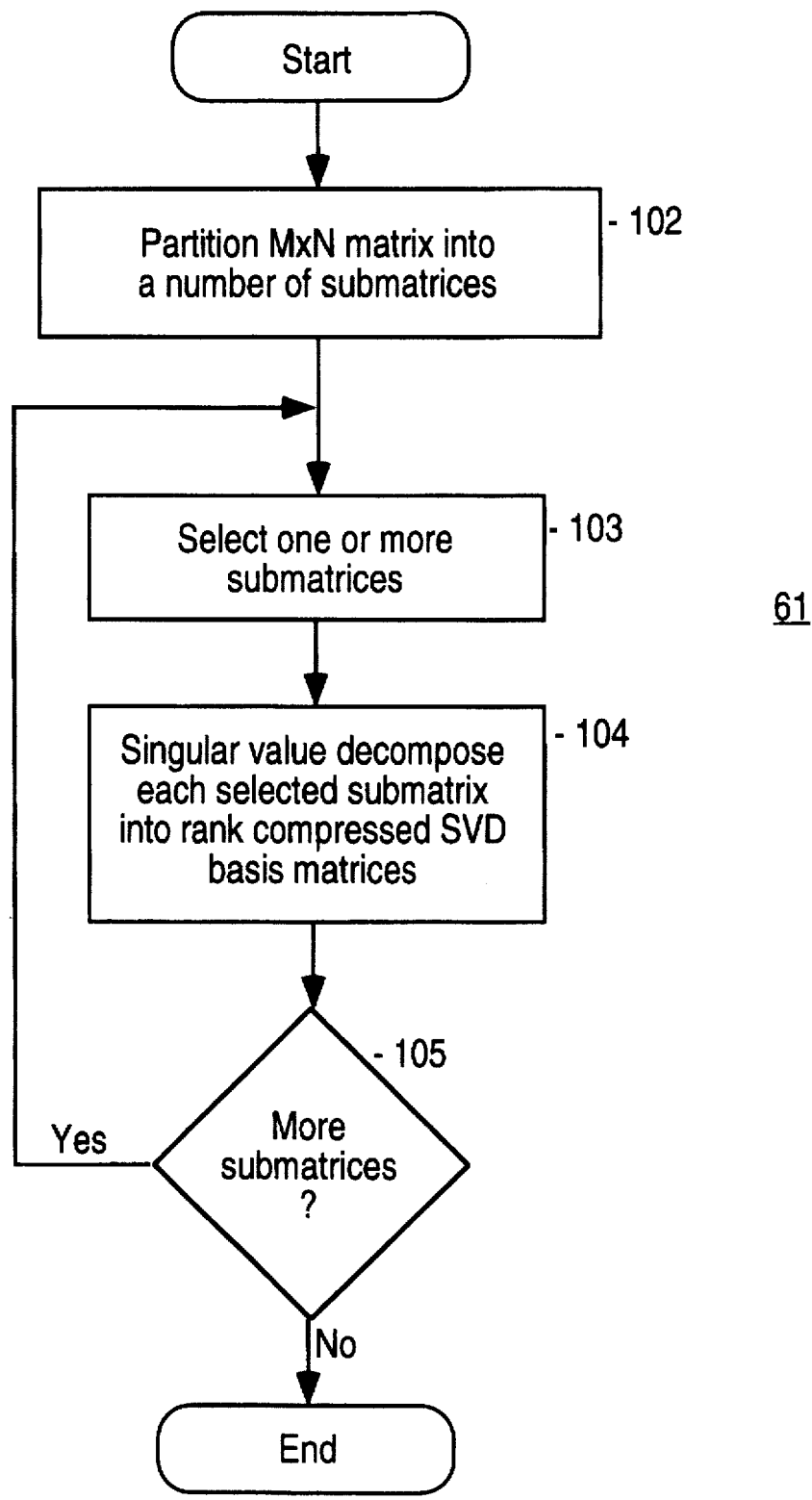
FIG. 6 illustrates the computer implemented method step of partitioning a coefficient matrix into submatrices, and generating rank compressed SVD basis matrices for the partitioned submatrices in further detail.

FIGS. 6 illustrates one embodiment of the coefficient matrix partitioning and rank compressed SVD basis matrices generation step (step 61 of FIG. 5) in further detail. Upon invocation, basis matrices generator 54 first partitions the coefficient matrix into a number of submatrices, step 102. Skipping now briefly to FIG. 11 wherein partition of an exemplary coefficient matrix 200 is illustrated. As shown, an exemplary M×N matrix 200, for ease of illustration, is partitioned into 16 equal sized submatrices 202–232, m×n A1 202, m×n A2 204, etc. etc. However, it should be noted that notwithstanding the illustration, there is no minimum nor maximum number of submatrices a coefficient matrix must partitioned into. Furthermore, none of the submatrices has to equal any other submatrices in size. In other words, a coefficient matrix may be partitioned into any number of submatrices having equal or unequal dimensions.

Partitioning of a coefficient matrix may be made in a variety of manners. In one embodiment, the coefficient matrix is partitioned ideally, in an application dependent manner, in accordance to the strength of association of the corresponding variables. In other words, coefficients of variables closely associated to each other are organized and partitioned into the same submatrices. Alternatively, in a multi-processor embodiment, the coefficient matrix may be partitioned practically, in an hardware architecture dependent manner, such that the submatrices are organized into groups representing approximately equal amount of workloads for the various processors. As a further alternative, in a parallel processing embodiment, the coefficient matrix may also be partitioned practically, in a hardware architecture dependent manner, such that processing associated with the submatrices are distributed correspondingly among the parallel processors, one submatrix for each parallel processor. The desired approach to partitioning may be provided to basis matrices generator 54 statically or dynamically. Thus, it will be apparent to one skilled in the art that the present invention may be practiced on a wide range of computer architectures, from a conventional high performance uniprocessor system to a modern massively parallel supercomputer system.

Figure 12:
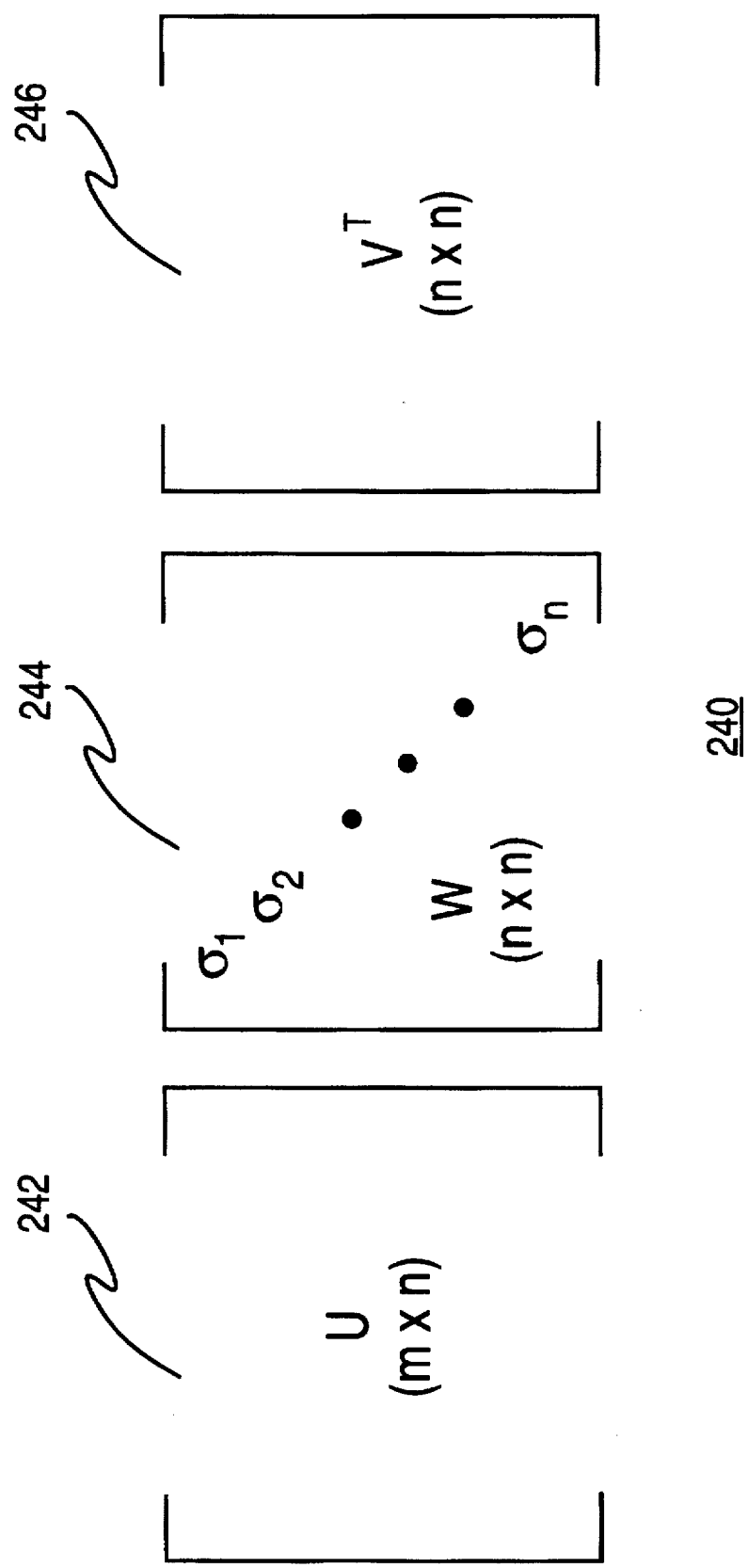
FIG. 12 illustrates the SVD basis matrices of a partitioned submatrix.

Referring now back to FIG. 6, upon partitioning the coefficient matrix, step 102, basis matrices generator 54 selects one or more of the submatrices, step 103. The order of selection is immaterial. Typically it is "chronologically" selected. The number of submatrices 202–232 selected for concurrent processing is dependent on hardware resources. Basis matrices generator 54 then singular value decomposes each selected submatrix 202–232 into rank compressed SVD basis matrices, step 104, which will be described in more detail below. Skipping now briefly to FIG. 12 wherein a singular value decomposition of an exemplary submatrix 202–232 is illustrated. As shown, SVD basis matrices 240 of a m×n submatrix 202–232 comprise a m×n column-orthogonal matrix U 242, a n x n diagonal matrix W 244 with positive or zero elements (the singular values $\sigma 1, \sigma 2 \ldots \sigma n$), and the transpose of a n×n orthogonal matrix V 246. Matrices U and V are each orthogonal in the sense that their columns are orthonormal. The m x n submatrix is equal to the product of $U.W.V^T$.

Referring back to FIG. 6 again, upon generating rank compressed SVD basis matrices 240 for the selected submatrix 202–232, step 104, basis matrices generator 54 repeats steps 104–108, one "group" of submatrices at a time, until rank compressed SVD basis matrices 240 have been generated for all partitioned submatrices 202–232.

In other words, the singular value decomposition and rank compression step, step 61, may be performed, one submatrix at a time, in a uniprocessor system, multiple submatrices at a time in a multi-processor system or even all submatrices at the same time in a large parallel processing computer system.

Figure 7:
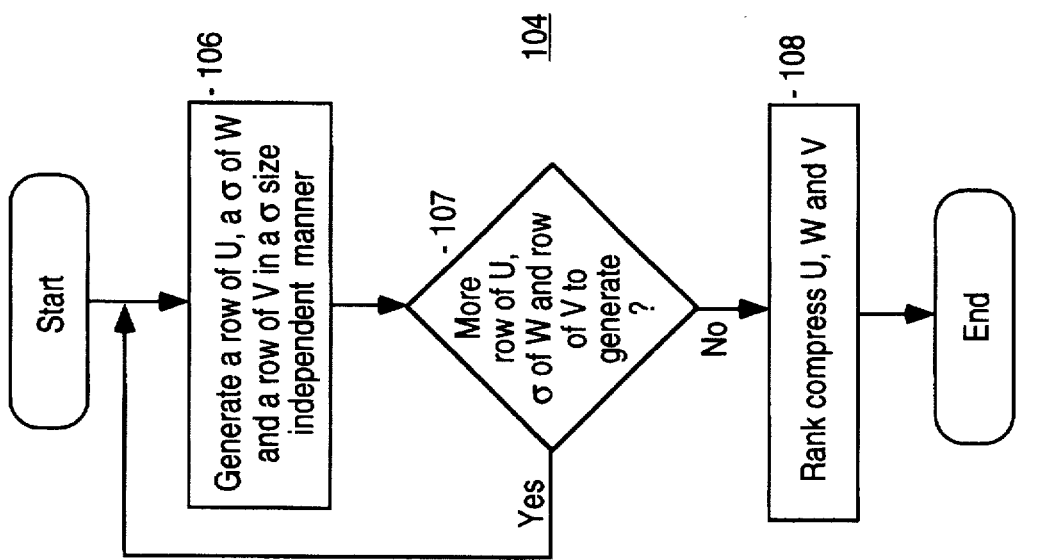
FIGS. 7 & 8 illustrate one embodiment of the computer implemented method steps for generating the rank compressed SVD basis matrices of a partitioned submatrix in further detail.
Figure 8:
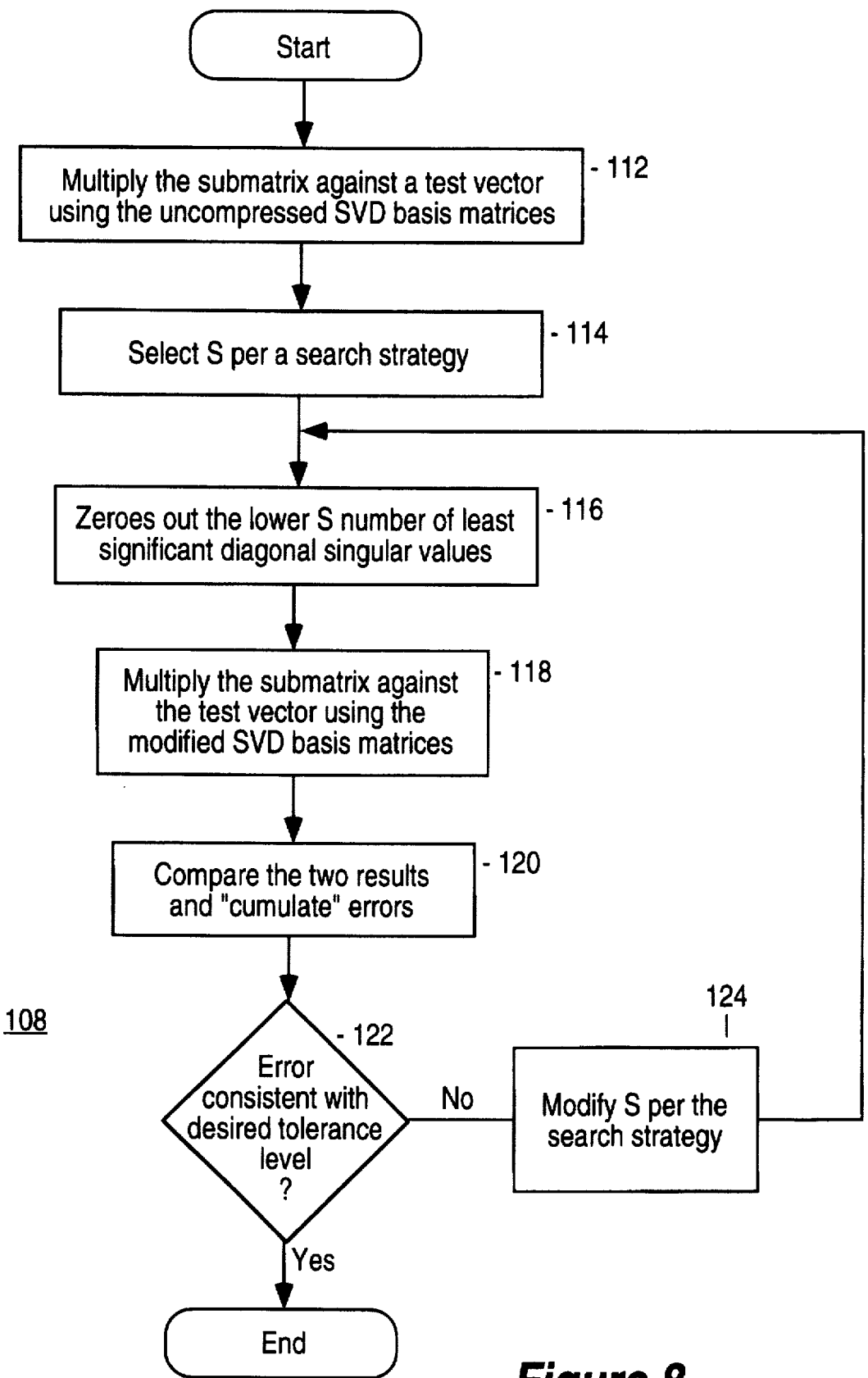

Referring now to FIGS. 7 & 8, two block diagrams illustrating one embodiment of the rank compressed SVD basis matrices generation step for one submatrix (i.e. step 104 of FIG. 6) in further detail are shown. As illustrated in FIG. 7, in this embodiment, basis matrix generator 54 generates a row of U 242, a $\sigma$ of W 244 and a row of V 246 in a $\sigma$ size independent manner, step 106. For the purpose of this disclosure, $\sigma$ size independent means step 106 is performed without regard to the size of $\sigma$ being generated. Basis matrix generator 54 then determines if there are more rows of U 242, $\sigma_s$ of W 244 and rows of V 246 to generate, step 107. As long as the determination result is positive at step 107, basis matrix generator 54 repeats step 106. The manner in which a row of U 242, a $\sigma$ of W 244 and a row of V 246 may be generated in a size independent manner is well known in the art and will not be further described herein. For further information, see Press et al., Numerical Recipes in FORTRAN, The Art of Scientific Computing, Second Edition, §2.6 Singular Value Decomposition, pp. 51–63, published by Cambridge University Press.

After all rows of U 242, $\sigma_s$ of W 244 and rows of V 246 have been generated, basis matrices generator 54 then compresses the diagonal singular values ($\sigma 1, \sigma 2 \ldots \sigma n$) of diagonal matrix W 244 by zeroing out the insignificant non-zero diagonal singular values ($\sigma 1, \sigma 2 \ldots \sigma n$) and their corresponding elements in U and V 242 and 246, step 108. Significance of the non-zero diagonal singular values (σ1, σ2 ... σn) are gauged by their contributions to achieving the desired calculation accuracy.

FIGS. 8 illustrates one embodiment of the rank compression step (step 108 of FIG. 7) in further detail. As shown, basis matrices generator 54 multiplies the submatrix against a test vector using the uncompressed SVD basis matrices 240, step 112. The uncompressed SVD basis matrices 240 are brought into memory 39 from the non-volatile storage devices 30 on an as needed basis. Then, basis matrices generator 54 selects a search index number (S) in accordance to a search strategy, step 114. For example, if there are 10 non-zero diagonal singular values (σ1, σ2 ... σ10), and a binary search strategy is used, S is set to 6. Next, basis matrices generator 54 zeroes out the lower S number of least significant diagonal singular values (σ1, σ2 ... σn) of diagonal matrix W 244, step 116. Using the above illustrated examples, the 6th through 10th least significant diagonal singular values are zeroed out. In other words, if σ2, σ4, σ6, σ8 and σ10 are the 6th through 10th least significant diagonal singular values, they are set to zeroes.

Having zeroed out a selected number of least significant diagonal singular values, basis matrices generator 54 then multiplies the rank compressed SVD basis matrices, i.e. the "modified" set of SVD basis matrices, against the test vector, step 118. Next, basis matrices generator 54 compares the results of the two trial multiplications, and cumulates the error using a predetermined error function, step 120. Any number of error functions may be employed. The basis matrices generator 54 then determines if the "cumulated" error is consistent with a desired error tolerance threshold, step 122. Similar to the preferred approach to partitioning coefficient matrices, the error tolerance threshold may be provided to the basis matrices generator 54 statically or dynamically.

If the "cumulated" error is determined at step 122 to be substantially under or above the desired error tolerance threshold, the value of S is adjusted up or down accordingly, step 124. Again using the above example, wherein a binary search strategy is employed, S would be move up or down half of the way, i.e. S would be set 3 or 8. Then, steps 116-122 are repeated with the new S value. Steps 116-122 are repeated again and again until the "cumulated" error is consistent with the desired error tolerance threshold. The rank compressed SVD basis matrices 240 are then store back onto non-volatile storage devices 30.

Figure 9:
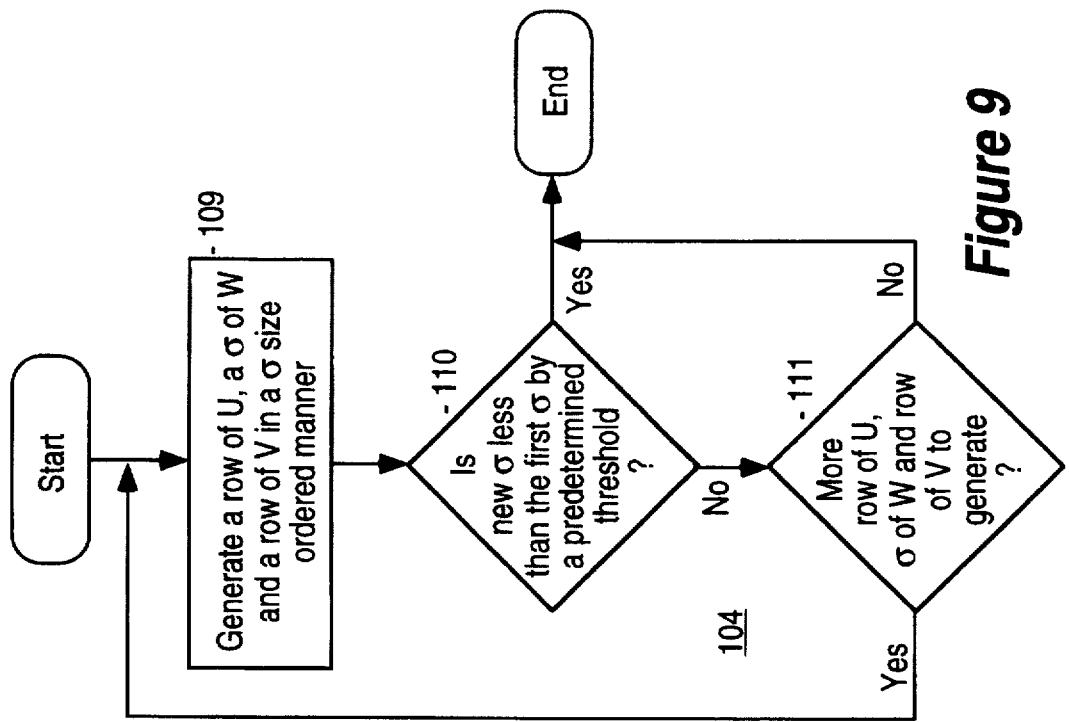
FIG. 9 illustrates an alternate embodiment of the computer implemented method steps for generating the rank compressed SVD basis matrices of a partitioned submatrix in further detail.

FIG. 9 illustrates an alternate embodiment of the rank compressed SVD basis matrices generation step (i.e. step 104 of FIG. 6) in further detail. Basis matrix generator 54 generates a row of U 242, a σ of W 244 and a row of V 246 in a σ size ordered manner, step 109. For the purpose of this disclosure, σ size ordered means step 109 is performed in the order σ's size. More specifically, the largest σ and its corresponding elements in U and V 242 and 246 are generated first, then the next largest σ and its corresponding elements in U and V 242 and 246, and so on, and so on. Basis matrix generator 54 then determines if the newly generated σ is less than the first σ by a predetermined threshold, step 110. Similar to the earlier described embodiment, the predetermined threshold may be provided to basis matrix generator 54 statically or dynamically. If the determination result at step 110 is positive, basis matrix generator 54 aborts the generation process. If the determination result at step 110 is negative, basis matrix generator 54 further determines if there are more rows of U 242, σ, of W 244 and rows of V 246 to generate, step 111. If the determination result is positive at step 111, basis matrix generator 54 repeats step 109. Basis matrix generator 54 repeats step 109 as long as the newly generated σ is not less than the first σ by the predetermined threshold, and there are more rows of U 242, σ, of W 244 and rows of V 246 to generate.

The essential steps in which a row of U 242, a σ of W 244 and a row of V 246 may be generated in a σ size ordered manner is also well known in the art and will not be further described herein either. For further information, see Golub G. H., Luk F. T., and Overton M. L., A Block Lanczos Method For Computing The Singular Values And Corresponding Singular Vectors Of A Matrix, ACM Transactions on Mathematical Software, Vol. 7, No. 2, Jun. 1981, Pages 149–169, and Underwood, R., An Iterative Block Lanczos Method For The Solution Of Large Sparse Symmetric Eigen Problems, Ph.D. Thesis, Rep. STAN- CS-75–496, Computer Science Dept., Stanford U., California, 1975.

Having now described two embodiments for generating rank compressed SVD basis matrices, it should be noted that while the present invention is being described with the SVD basis matrices being rank compressed, the present invention may nevertheless be practiced without having the SVD basis matrices rank compressed. That is equivalent to having a desired 0% error tolerance threshold.

Figure 10:
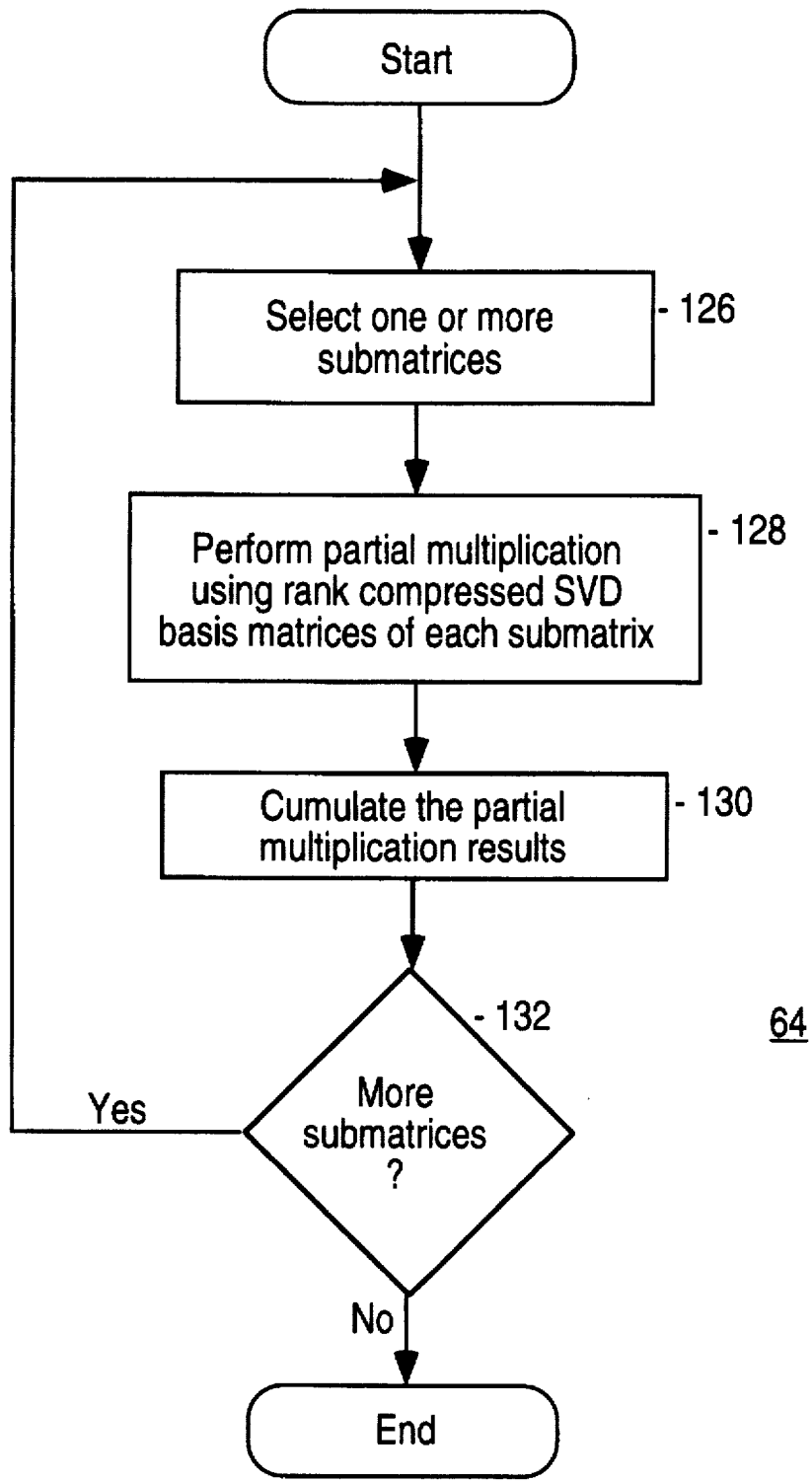
FIG. 10 illustrates the computer implemented method step of performing matrix multiplication using the rank compressed SVD basis matrices in further detail.

FIG. 10 illustrates one embodiment of the "indirect" multiplication step (step 64 of FIG. 5) in further detail. As shown, upon invocation, matrix multiplier 56 selects one or more of the partitioned submatrices 202–232, step 126. Again, the order of selection is immaterial. Typically, the submatrices 202–232 are selected in "chronological" order. The number of submatrices 202–232 selected for concurrent processing is dependent on hardware resources of the computer system. Upon selecting the submatrices 202–232, step 126, matrix multiplier 56 performs partial multiplication using the rank compressed SVD basis matrices 240 of each submatrix, step 128. The partial results are then accumulated into the appropriate matrix elements of the product matrix, step 130. The compressed SVD basis matrices 240 are brought into volatile memory 39 from the non-volatile storage devices 30 on an as needed basis if they are stored on the non-volatile storage devices 30. Due to the reduced sizes of the rank compressed SVD basis matrices 240, the partial results of the product matrix may be stored either on volatile memory 39 or the non-volatile storage devices 30. Matrix multiplier 56 repeats steps 126–130 for each "group" of submatrices 202–232, until all their partial results are accumulated into the product matrix.

In other words, partial multiplications may be performed one submatrix at a time in a uniprocessor system, multiple submatrices at a time in a multi-processor system or all submatrices at the same time in a large parallel processing computer system. It should also be noted that as a result of the reduced sizes of the rank compressed SVD basis matrices, the total number of floating point operations required to perform all the partial multiplications to solve a dense system of linear equations are signficantly less than the total number of floating point operations required to perform all multiplications involving the coefficient matrix directly. In fact, experience has shown that the total compute time can be reduced by two orders of magnitude. For an exemplary dense system of linear equations having 1M+ variables, using a typical Paragon™ parallel processing computer, the total computation time was reduced to 10+ hours when the present invention is practiced from 1000+ hours when a prior art approach is used. Thus, employing the present invention, "moderate" size systems of linear equations may be solved with typical multi-processor systems instead of large parallel processing systems, and "smaller" size systems of linear equations may be solved with even uniprocessor systems instead of multi-processor systems.

Thus, a method and apparatus for solving dense systems of linear equations using rank compressed SVD basis matrices of partitioned submatrices of the coefficient matrix has been described. While the methods and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer implemented method for solving dense systems of linear equations on a parallel processing computer system comprising the steps of:

a) partitioning a coefficient matrix of a dense system of linear equations into a plurality of submatrices by processor means of the parallel processing computer system, and storing the submatrices by the processor means onto storage means of the parallel processing computer system in electromagnetic/optical representations;

b) generating in parallel a plurality of sets of singular value decomposed (SVD) basis matrices for the submatrices by the processor means, one set of SVD basis matrices for each submatrix, and rank compressing in parallel the SVD basis matrices in accordance to a calculation error tolerance limit by the processor means, and storing in parallel the rank compressed SVD basis matrices by the processor means onto the storage means of the parallel processing computer system in electromagnetic/optical representations; and c) iteratively solving the dense system of linear equations by the processor means, performing all matrix multiplications involving the coefficient matrix indirectly by performing in parallel partial matrix multiplications using the rank compressed SVD basis matrices of the partitioned submatrices, and accumulating the partial matrix multiplication results.

2. The computer implemented method of claim 1, wherein step (a) is performed by the processor means in a manner such that coefficients corresponding to a set of closely related variables of the dense system of linear equations are partitioned into the same submatrix, and stored together in eletromagnetic/optical representations in the storage means.

3. The computer implemented method of claim 1, wherein step (a) is performed by the processor means in a manner that maximizes utilization of computing resources of the processor means.

4. The computer implemented method of claim 1, wherein the processor means generates in parallel a set of SVD basis matrices, rank compresses in parallel the generated set of SVD basis matrices, and stores in parallel the generated set of rank compressed SVD basis matrices onto the storage means of the parallel processing computer system in electromagnetic/optical representations, for one submatrix at a time, when performing step (b).

5. The computer implemented method of claim 1, wherein the processor means generates in parallel multiple sets of SVD basis matrices, rank compresses in parallel the generated multiple sets of SVD basis matrices, and stores in parallel the generated sets of rank compressed SVD basis matrices onto the storage means of the parallel processing computer system in electromagnetic/optical representations, for multiple submatrices at a time, when performing step (b).

6. The computer implemented method of claim 1, wherein the processor means generates in parallel all sets of SVD basis matrices, rank compresses in parallel the generated sets of SVD basis matrices, and stores in parallel the generated sets of rank compressed SVD basis matrices onto the storage means of the parallel processing computer system in electromagnetic/optical representations, for all submatrices at the same time, when performing step (b).

7. The computer implemented method of claim 1, wherein step (b) comprises the steps of:

(b.1) for each submatrix, generating in parallel a row of a column-orthogonal matrix (U), a singular value diagonal element ($\sigma$) of a diagonal matrix (W) and a row of an orthogonal matrix (V) for the submatrix by the processor means in a $\sigma$ size independent manner, and storing in parallel the generated row of U, the singular value of W and the row of V onto storage means of the parallel processing computer systems in electromagnetic/optical representations; and (b.2) repeating step (b.1) by the processor means until all rows of U, all $\sigma$s of W and all rows of V for each submatrix have been generated by the processor means in the $\sigma$ size independent manner and stored onto the storage means of the parallel processing computer system in electromagnetic/optical representations.

8. The computer implemented method of claim 7, wherein step (b) further comprises step (b.3) for each submatrix, upon performing steps (b.1) and (b.2), rank compressing in parallel the stored matrices U, W and V by the processor means in accordance to the calculation error tolerance limit.

9. The computer implemented method of claim 8, wherein step (b.3) comprises for each submatrix, zeroing out insignificant non-zero $\sigma$s of W and their corresponding elements of U and V by the processor means in a manner consistent with the calculation error tolerance limit.

10. The computer implemented method of claim 1, wherein step (b) comprises the steps of:

(b.1) for each submatrix, generating in parallel a row of a column-orthogonal matrix (U), a singular value diagonal element (($\sigma$) of a diagonal matrix (W) and a row of an orthogonal matrix (V) for the submatrix by the processor means in a $\sigma$ size dependent manner, and storing in parallel the generated row of U, the singular value of W and the row of V onto storage means of the parallel processing computer system in electromagnetic/optical representations; and (b.2) repeating step (b.1) for each submatrix by the processor means until either a newly generated $\sigma$ of the submatrix is less than the first generated $\sigma$s of the submatrix by a predetermined threshold, or all rows of U, all $\sigma$s of W and all rows of V of the submatrix have been generated by the processor means in the $\sigma$ size independent manner and stored onto the storage means of the computer system in electromagnetic/optical representations.

11. The computer implemented method of claim 1, wherein the processor means stores in parallel the generated sets of rank compressed SVD basis matrices in electromagnetic representations on high performance volatile memory of the storage means of the parallel processing computer system, when performing step (b).

12. The computer implemented method of claim 1, wherein for each matrix multiplication involving the coefficient matrix, the processor means performs in parallel partial multiplications, one submatrix at a time, using the submatrix's set of rank compressed SVD basis matrices, and accumulating the partial multiplication results in a product matrix, when performing step (c).

13. The computer implemented method of claim 1, wherein for each matrix multiplication involving the coefficient matrix, the processor means performs in parallel partial multiplications, a group of submatrix at a time, using the group of submatrices' sets of rank compressed SVD basis matrices, and accumulating the partial multiplication results in a product matrix, when performing step (c).

14. The computer implemented method of claim 1, wherein for each matrix multiplication involving the coefficient matrix, the processor means performs in parallel partial multiplications, for all submatrices at the same time, using the submatrices' sets of rank compressed SVD basis matrices, and accumulating the partial multiplication results in a product matrix, when performing step (c).

15. The computer implemented method of claim 1, wherein the processor means stores in parallel the generated sets of rank compressed SVD basis matrices in electromagnetic representations on high performance volatile memory of the storage means of the computer systems, when performing step (b); and the processor means accumulates the partial multiplication results in the product matrix in electromagnetic representations on high performance volatile memory of the storage means of the parallel processing computer system, when performing step (c).

16. A parallel processing computer system comprising:

a) storage means for storing program means and data in electromagnetic/optical representations; and b) processor means coupled to the storage means for executing first program means stored on the storage means, the first program means having b.1) first function means for partitioning a coefficient matrix of a dense system of linear equations stored on the storage means, into a plurality of submatrices, and storing the submatrices onto storage means in electromagnetic/optical representations, b.2) second function means for generating in parallel a plurality of sets of singular value decomposed (SVD) basis matrices for the submatrices, one set of rank compressed SVD basis matrices for each submatrix, rank compressing in parallel the generated sets of SVD basis matrices in accordance to a calculation error tolerance limit, and storing in parallel the rank compressed SVD basis matrices onto the storage means in electromagnetic/optical representations, and b.3) third function means for iteratively solving the dense system of linear equations, performing all matrix multiplications involving the coefficient matrix indirectly by performing in parallel partial matrix multiplications using the generated sets of rank compressed SVD basis matrices of the partitioned submatrices, and accumulating the partial matrix multiplication results.

17. The computer system as set forth in claim 16, wherein the first function means partitions the coefficient matrix in a manner such that coefficients corresponding to a set of closely related variables of the dense system of linear equations are partitioned into the same submatrix, and stored together in eletromagnetic/optical representations in the storage means.

18. The computer system as set forth in claim 16, wherein the first function means partitions the coefficient matrix in a manner that maximizes utilization of computing resources of the processor means.

19. The computer system as set forth in claim 16, wherein the second function means generates in parallel a set of SVD basis matrices, and rank compresses in parallel the generated set of SVD basis matrices, and stores in parallel the generated set of rank compressed SVD basis matrices onto the storage means in electromagnetic/optical representations, for one submatrix at a time.

20. The computer system as set forth in claim 16, wherein, the processor means comprises a plurality of processors; and the second function means generates in parallel multiple sets of SVD basis matrices, rank compresses in parallel the generated multiple sets of SVD basis matrices, and stores in parallel the generated sets of rank compressed SVD basis matrices onto the storage means in electromagnetic/optical representations, for multiple submatrices at a time.

21. The computer system as set forth in claim 16, wherein, the processor means comprises at least N parallel processors;

the first function means partitions the coefficient matrix into N submatrices; and the second function means generates in parallel all N sets of SVD basis matrices, rank compresses in parallel all N generated sets of SVD basis matrices, and stores in parallel the generated N sets of rank compressed SVD basis matrices onto the storage means in electromagnetic/optical representations, for all N submatrices at the same time.

22. The computer system as set forth in claim 16, wherein, the second function means, for each submatrix, generates in parallel a row of a column-orthogonal matrix (U), a singular value diagonal element ($\sigma$) of a diagonal matrix (W) and a row of an orthogonal matrix (V) for the submatrix in a $\sigma$ size independent manner, and storing in parallel the generated row of U, the singular value of W and the row of V onto storage means in electromagnetic/optical representations; and the second function means repeats the singular value and corresponding rows generation step until all rows of U, all $\sigma$s of W and all rows of V for each submatrix have been generated in the $\sigma$ size independent manner and stored onto the storage means in electromagnetic/optical representations.

23. The computer system as set forth in claim 22, wherein the second function means for each submatrix, upon generating and storing matrices U, W, V for the submatrix, rank compresses in parallel the stored matrices U, W and V in accordance to a calculation error tolerance limit.

24. The computer system as set forth in claim 23, the second function means rank compresses in parallel matrices U, W, V of a submatrix by zeroing out insignificant non-zero $\sigma$s of W and their corresponding elements of U and V in a manner consistent with the calculation error tolerance limit.

25. The computer system as set forth in claim 16, wherein, the second function means, for each submatrix, generates in parallel a row of a column-orthogonal matrix (U), a singular value diagonal element ($\sigma$) of a diagonal matrix (W) and a row of an orthogonal matrix (V) for the submatrix in a $\sigma$ size dependent manner, and stores in parallel the generated row of U, the singular value of W and the row of V onto storage means in electromagnetic/optical representations; and the second function means repeats the singular value and corresponding rows generation until either a newly generated $\sigma$ of the submatrix is less than the first generated $\sigma$ of the submatrix by a predetermined threshold, or all rows of U, all $\sigma$s of W and all rows of V of the submatrix have been generated in the σ size independent manner and stored onto the storage means in electromagnetic/optical representations.

26. The computer system as set forth in claim 16, wherein, storage means comprises high performance volatile memory; and the second function means stores in parallel the generated sets of rank compressed SVD basis matrices in electromagnetic representations in the high performance volatile memory.

27. The computer system as set forth in claim 16, wherein for each matrix multiplication involving the coefficient matrix, the third function means performs in parallel partial multiplications, one submatrix at a time, using the submatrix's set of rank compressed SVD basis matrices, and accumulating the partial multiplication results in a product matrix.

28. The computer system as set forth in claim 16, wherein, the processor means comprises a plurality of processors; and the third function means, for each matrix multiplication involving the coefficient matrix, performs in parallel partial multiplications, a group of submatrix at a time, using the group of submatrices' sets of rank compressed SVD basis matrices, and accumulating the partial multiplication results in a product matrix.

29. The computer system as set forth in claim 16, wherein, the processor means comprises at least N parallel processors; and the third function means, for each matrix multiplication involving the coefficient matrix, performs in parallel partial multiplications, for all N submatrices at the same time, using the N submatrices' sets of rank compressed SVD basis matrices, and accumulating the partial multiplication results in a product matrix.

30. The computer system as set forth in claim 16, wherein the storage means comprises high performance volatile memory;

the second functions means stores in parallel the generated sets of rank compressed SVD basis matrices in electromagnetic representations in the high performance volatile memory; and the third means accumulates the partial multiplication results in the product matrix in electromagnetic representations in the high performance volatile memory.

31. A parallel processing computer system comprising:

a) storage means, including N high performance volatile memory units and at least one non-volatile mass storage, for storing program means and data in electromagnetic/optical representations; and b) processor means coupled to the storage means, including at least N processors, for executing first program means stored on the storage means, the first program means having b.1) first function means for partitioning a coefficient matrix of a dense system of linear equations stored on the storage means, into N submatrices, and storing the submatrices in the N high performance volatile memory units in electromagnetic/optical representations, b.2) N second function means for generating in parallel N of sets of singular value decomposed (SVD) basis matrices for the N submatrices at the same time, one set of rank compressed SVD basis matrices for each submatrix, rank compressing in parallel the N generated sets of SVD basis matrices in accordance to a calculation error tolerance limit, and storing in parallel the rank compressed SVD basis matrices in the N high performance volatile memory units in electromagnetic/optical representations, and b.3) N third function means for iteratively solving the dense system of linear equations, performing all matrix multiplications involving the coefficient matrix indirectly by performing in parallel partial matrix multiplications using the N sets of rank compressed SVD basis matrices of the partitioned submatrices at the same time, and accumulating the partial matrix multiplication results.

32. The parallel processing computer system as set forth in claim 31, wherein, each second function means generates a row of a column-orthogonal matrix (U), a singular value diagonal element ((σ) of a diagonal matrix (W) and a row of an orthogonal matrix (V) for one of the N submatrices in a σ size dependent manner, and stores the generated row of U, the singular value of W and the row of V in one of the high performance volatile memory units in electromagnetic/optical representations; and each second function means repeats the singular value and corresponding rows generation until either a newly generated σ of the submatrix is less than the first generated σ of the submatrix by a predetermined threshold, or all rows of U, all σs of W and all rows of V of the submatrix have been generated in the σ size independent manner and stored in the high performance volatile memory unit in electromagnetic/optical representations.

* * * * *

UNITED STATES PATENT AND TRADEMARK OFFICE
CERTIFICATE OF CORRECTION

PATENT NO. : 5,548,798
DATED : August 20, 1996
INVENTOR(S) : Adrian S. King

It is certified that error appears in the above-indentified patent and that said Letters Patent is hereby corrected as shown below:

In column 9 at line 57 delete "system" and insert --systems--

In column 9 at line 66 delete "system" and insert --systems--

In column 10 at line 6 delete "system" and insert --systems--

In column 10 at line 39 delete "element (" and insert --element--

In column 10 at line 44 delete "system" and insert --systems--

In column 10 at line 48 delete "σs" and insert --σ--

In column 11 at line 25 delete "system," and insert --systems,--

In column 14 at lines 34-35 delete "element ((σ)" and insert --element (σ)--

Signed and Sealed this

Tenth Day of December, 1996

Attest:

BRUCE LEHMAN

*Attesting Officer*     *Commissioner of Patents and Trademarks*